US012492571B2

(12) United States Patent
Jerry et al.

(10) Patent No.: US 12,492,571 B2
(45) Date of Patent: Dec. 9, 2025

(54) PORTABLE SHELTERS

(71) Applicant: ARDISAM, INC., Cumberland, WI (US)

(72) Inventors: Ben Jerry, Cumberland, WI (US); Trevor Kinderman, Rice Lake, WI (US); David Hare, Comstock, WI (US)

(73) Assignee: ARDISAM, INC., Cumberland, WI (US)

( * ) Notice: Subject to any disclaimer, the term of this patent is extended or adjusted under 35 U.S.C. 154(b) by 0 days.

(21) Appl. No.: 18/615,806

(22) Filed: Mar. 25, 2024

(65) Prior Publication Data

US 2024/0384558 A1 Nov. 21, 2024

Related U.S. Application Data

(63) Continuation of application No. 18/059,017, filed on Nov. 28, 2022, now Pat. No. 11,959,297, which is a (Continued)

(51) Int. Cl.
*E04H 15/38* (2006.01)
*E04H 15/00* (2006.01)

(Continued)

(52) U.S. Cl.
CPC ........... *E04H 15/001* (2013.01); *E04H 15/38* (2013.01); *E04H 15/46* (2013.01); *A01K 97/01* (2013.01)

(58) Field of Classification Search
CPC ....... E04H 15/50; E04H 15/001; E04H 15/38; E04H 15/46

(Continued)

(56) References Cited

U.S. PATENT DOCUMENTS 1,502,898 A 7/1924 Berg
2,513,764 A 7/1950 Vonder (Continued)

FOREIGN PATENT DOCUMENTS

| | | | |
|---|---|---|---|
| CN | 102535945 | A | 7/2012 |
| CN | 211691769 | U | 10/2020 |
| KR | 20090045701 | A | 5/2009 |

OTHER PUBLICATIONS

Barronett Blinds , "How to Set-up and Take-down a Hub Blind from Barronett Blinds", YouTube, URL: https://www.youtube.com/watch?v=gEO1EBG5EQg, Jul. 18, 2013.

(Continued)

*Primary Examiner* — Noah Chandler Hawk
(74) *Attorney, Agent, or Firm* — PERKINS COIE LLP

(57) ABSTRACT

A stowable and deployable shelter may include a frame structure with a first support arch pivotably attached to a base at a pair of pivot points, and a second support arch pivotably attached to the first support arch via a pair of slidable hinges. The slidable hinges are positioned to translate along the first support arch toward and away from the pair of pivot points. In some embodiments, at least one of the slidable hinges includes a locking mechanism for releasably locking the at least one slidable hinge at a selected location along the first support arch. In some embodiments, the hinges may be fixed instead of being slidable. The support arches support a fabric shell to form an interior of the shelter. The base may include a sled container having runners for sliding through snow or across terrain.

18 Claims, 11 Drawing Sheets

Related U.S. Application Data continuation of application No. 17/133,991, filed on Dec. 24, 2020, now Pat. No. 11,542,720.

(51) Int. Cl.
*E04H 15/46* (2006.01)
*A01K 97/01* (2006.01)

(58) Field of Classification Search
USPC .................................................. 135/148, 150
See application file for complete search history.

(56) References Cited

U.S. PATENT DOCUMENTS

| | | | | | |
|---|---|---|---|---|---|
| 2,953,145 | A | | 9/1960 | Moss et al. | |
| 3,266,503 | A | | 8/1966 | Hoiness et al. | |
| 3,327,723 | A | | 6/1967 | Burgin | |
| 3,865,123 | A | | 2/1975 | Bracken | |
| 4,066,089 | A | | 1/1978 | Rainwater | |
| 4,084,599 | A | * | 4/1978 | Matthews | E04H 15/38 135/132 |
| 4,227,542 | A | * | 10/1980 | Bonfilio | E04H 4/108 D25/19 |
| 4,239,247 | A | | 12/1980 | Hinz | |
| 4,585,020 | A | | 4/1986 | Masuda et al. | |
| 4,938,243 | A | | 7/1990 | Foster | |
| 5,046,882 | A | | 9/1991 | Ju | |
| 5,159,947 | A | * | 11/1992 | Chuang | E04H 15/38 135/132 |
| 5,271,423 | A | | 12/1993 | Eychaner | |
| 5,749,387 | A | | 5/1998 | Thompson | |
| 6,089,247 | A | | 7/2000 | Price | |
| 6,216,717 | B1 | | 4/2001 | Chen | |
| 6,666,223 | B2 | | 12/2003 | Price et al. | |
| 6,776,179 | B1 | | 8/2004 | Chen | |
| 6,868,858 | B2 | | 3/2005 | Suh | |
| 6,951,327 | B1 | | 10/2005 | Seo | |
| 7,168,439 | B2 | | 1/2007 | Patel et al. | |
| 7,357,140 | B2 | | 4/2008 | Chu et al. | |
| 7,607,447 | B1 | | 10/2009 | Han | |
| 7,637,276 | B2 | | 12/2009 | Mallookis et al. | |
| 7,640,942 | B2 | | 1/2010 | Chu | |
| 7,703,469 | B2 | | 4/2010 | Danziger | |
| 7,845,364 | B2 | | 12/2010 | Tolmie | |
| 8,056,573 | B2 | | 11/2011 | Panigot | |
| 8,079,380 | B2 | | 12/2011 | Engstrom et al. | |
| 8,555,909 | B2 | * | 10/2013 | Chen | E04H 15/38 135/133 |
| 8,746,179 | B2 | | 6/2014 | Farmer et al. | |
| 8,776,816 | B2 | | 7/2014 | Danziger | |
| 9,194,153 | B2 | | 11/2015 | Makos et al. | |
| 9,340,992 | B2 | | 5/2016 | Huang | |
| 9,394,718 | B1 | * | 7/2016 | Hill | E04H 15/001 |
| 9,506,269 | B2 | | 11/2016 | Armstrong et al. | |
| 9,644,387 | B2 | | 5/2017 | Makos et al. | |
| 10,058,181 | B2 | | 8/2018 | Makos | |
| 10,612,265 | B1 | | 4/2020 | Walter | |
| 10,676,955 | B1 | | 6/2020 | Tufto et al. | |
| 11,428,023 | B2 | | 8/2022 | Furseth et al. | |
| 2006/0238005 | A1 | | 10/2006 | Walter et al. | |
| 2007/0051399 | A1 | | 3/2007 | Jung | |
| 2009/0320893 | A1 | | 12/2009 | Engstrom et al. | |
| 2010/0126546 | A1 | | 5/2010 | Chen | |
| 2012/0042920 | A1 | | 2/2012 | Armstrong et al. | |
| 2012/0186619 | A1 | | 7/2012 | Makos | |
| 2013/0008478 | A1 | | 1/2013 | Prieto Estebanez | |
| 2014/0109945 | A1 | | 4/2014 | Jin | |
| 2014/0130837 | A1 | | 5/2014 | Sy-facunda | |
| 2014/0202509 | A1 | | 7/2014 | Schamberger et al. | |
| 2016/0010357 | A1 | | 1/2016 | Makos et al. | |
| 2017/0339941 | A1 | | 11/2017 | Burchfield | |
| 2021/0332607 | A1 | | 10/2021 | Goldszer et al. | |
| 2021/0396037 | A1 | | 12/2021 | Furseth et al. | |
| 2022/0136276 | A1 | | 5/2022 | Furseth et al. | |
| 2022/0205270 | A1 | | 6/2022 | Jerry et al. | |

OTHER PUBLICATIONS

Clam Outdoors , "XL Thermal House, YouTube", URL: https://www.youtube.com/watch?v=tCOQJUOatnk, Nov. 10, 2019.
Clam Outdoors , "Yukon XL Thermal Ice Fishing Shelter", URL: https://shop.clamoutdoors.com/yukon-xl-thermal.html; web page visited Dec. 7, 2020.
Eskimo Fishing Gear , "Sled Style Shelters", URL: https://geteskimo.com/collections/sled; web page visited Dec. 11, 2020.
Gazebo Store , "Easy Pop-Up Party Tent", available at https://www.thegazebostore.com/easy-pop-up-party-tent-13-x-13.html, exact publication date unknown, web site visited Jun. 18, 2020.
Habo Habo , "Tent with Hub—Six-Sided Tent with Accessories", available at https://www.aliexpress.com/i/4000340662867.html; exact publication date unknown, web page visited Sep. 12, 2020.
Helinox , "Outdoor Furniture", URL: https://helinox.com/pages/our-story; web page visited Dec. 11, 2020.
Houzz , "Outsunny 13' x 13' Adjustable Height Pop up Canopy Party Tent with Easy Setup", URL: https://www.houzz.com/products/outsunny-13-x-13-adjustable-height-pop-up-canopy-party-tent-with-easy-setup-prvw-vr~87130317; web page visited Dec. 7, 2020.
Ice Forts Custom Fish Houses , "XT Pro Lodge Shelter", URL: https://iceforts.com/product/xt-pro-lodge-shelter/; web page visited Dec. 11, 2020.
Kapsco Moto , "4 Bow Boat Bimini Top Cover", URL: https://www.sportsrecreationmall.com/product.jhtm?sku=kpscm3541&utm_medium=CPA&utm_campaign=commissionjunction&utm_source=affiliate&content=46157&cjevent=1d6458ad3bbd11eb823601670a1c0e0d; web page visited Dec. 7, 2020.
Michigan Sportsman Forum , "Ground Blind Roof Collapse", URL: https://www.michigan-sportsman.com/forum/threads/ground-blind-roof-collapse.517897/; Sep. 2014; web page visited Dec. 7, 2020.
Mountains for Everyone , "What Is Freestanding Tent", URL: https://mountainsforeverybody.com/what-is-freestanding-tent-and-what-is-non-freestanding-tent; web page visited Dec. 11, 2020.
Pegasus Auto Racing Supplies , "EZ-UP Snap Button for Legs", Available at https://www.pegasusautoracing.com/productdetails.asp?RecID=4867, exact publication unknown, website visited Sep. 12, 2020.
Rock West Composites , "Telescoping Clamps", URL: https://www.rockwestcomposites.com/shop/connector-accessories/locking-telescoping-mechanisms/telescoping-clamps, web page visited Dec. 16, 2020.
Taylor Made , "Bimini Support Poles", URL: https://www.taylormadeproducts.com/products/biminis/support-poles/, web page visited Dec. 7, 2020.

* cited by examiner

PORTABLE SHELTERS

CROSS REFERENCE TO RELATED APPLICATIONS

This application is a continuation of U.S. patent application Ser. No. 18/059,017, filed Nov. 28, 2022, which is a continuation of U.S. patent application Ser. No. 17/133,991, filed Dec. 24, 2020, both of which are incorporated herein by reference in their entirety.

BACKGROUND

Ice fishermen and outdoor enthusiasts often use portable shelters to protect themselves from the elements. Some portable shelters can be carried by a sled, cart, or other transport device. For example, sled-based shelters can be dragged by the user to a location, where the shelter may be deployed from the sled for use until it is stowed again and dragged to another location. Sled-based shelters typically have a fabric covering attached to a deployable and stowable frame structure. The fabric covering may have one or more doors or openable panels to allow ingress and egress.

Many sled-based shelters have front doors that are cumbersome to access when gear or other objects are positioned between the sled and the door. Accordingly, some sled-based shelters include a side door. However, elements of frame structures in conventional portable shelters often obstruct side doors, which hinders ingress and egress. Conventional sled-based shelters that attempt to address the problem of obstructing the side door utilize excessive parts (such as removable parts that can be lost or damaged) or they require excessive steps during deployment to achieve an unobstructed side door (such as disconnecting and reconnecting elements during deployment).

SUMMARY

Representative embodiments of the present technology include a stowable and deployable shelter having a frame structure, the frame structure having a first support arch pivotably attached to a base at a pair of pivot points, and a second support arch pivotably attached to the first support arch via a pair of slidable hinges. The slidable hinges are positioned to translate along the first support arch toward and away from the pair of pivot points. In some embodiments, at least one of the slidable hinges comprises a locking mechanism for releasably locking the at least one slidable hinge at a selected location along the first support arch. In some embodiments, the hinges may be fixed instead of being slidable. The support arches support a fabric shell to form an interior of the shelter. The base may include a sled container having runners for sliding through snow or across terrain.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the several views:

In FIG. 3A, the shelter is in a stowed configuration, with a frame structure collapsed onto or into a container and a fabric shell folded around the collapsed frame structure. FIG. 3B shows the shelter in an early stage of the deployment process, with a ground arch pivoted away from the container to rest on the ground and the fabric shell partially unfolded. FIGS. 3C and 3D show next steps in the deployment sequence, as portions of the frame structure and fabric shell pivot and unfold. In FIG. 3E, a sliding hinge, which supports a cantilevered arch, is shown as having moved (slid) along a middle roof arch and is releasably locked into position. FIG. 3F illustrates a final or nearly final step in deployment of the shelter, in which a rear roof arch is pivoted upwardly into a generally upright position.

DETAILED DESCRIPTION

The present technology is directed to portable shelters, sliding hinges for portable shelters, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments. Accordingly, embodiments of the present technology may include additional elements or exclude some of the elements described below with reference to FIGS. 1-10, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Further, unless otherwise specified, terms such as "attached" or "connected" are intended to include integral connections, as well as connections between physically separate components.

Figure 1:
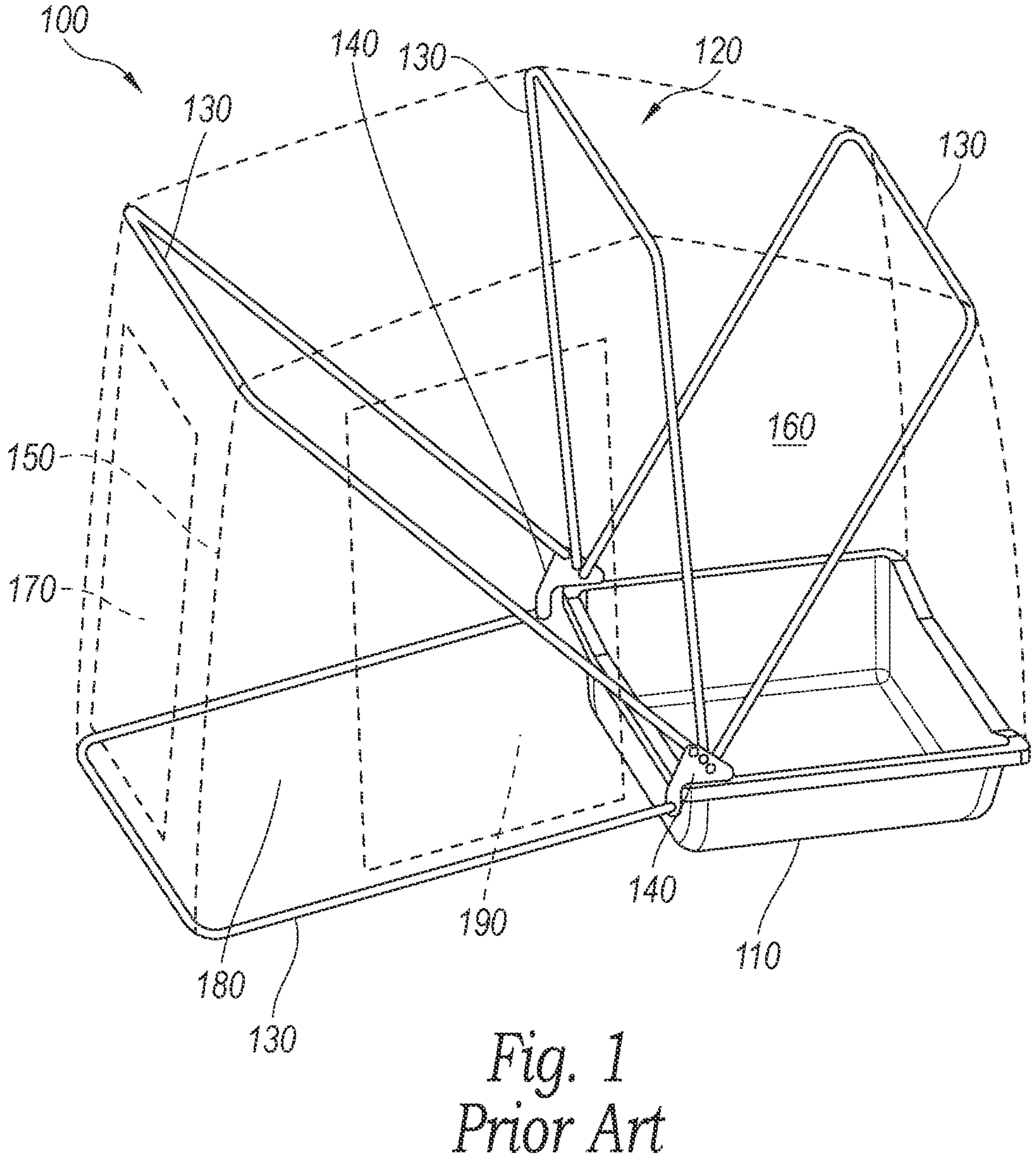
Fig. 1 Prior Art
FIG. 1 illustrates a conventional shelter in a deployed configuration.

FIG. 1 illustrates a conventional shelter 100 in a deployed configuration. A conventional shelter 100 may include a sled container 110 and a frame structure 120 that is deployable from the sled container 110 (which may be referred to simply as a sled). The frame structure 120 may include a plurality of support arches 130 that pivot from the sled container 110 via hinges 140. A conventional shelter 100 may also include a fabric shell 150 (shown as an outline in FIG. 1), encasing the interior 160 of the shelter 100. The fabric shell 150 may include a front door or front panel opening 170 (shown as an outline in FIG. 1). As explained above, one drawback to conventional prior art shelters 100 is that a support arch 130 may obstruct or prevent implementation of a side door or side panel opening 190 (shown as an outline in FIG. 1).

Figure 2:
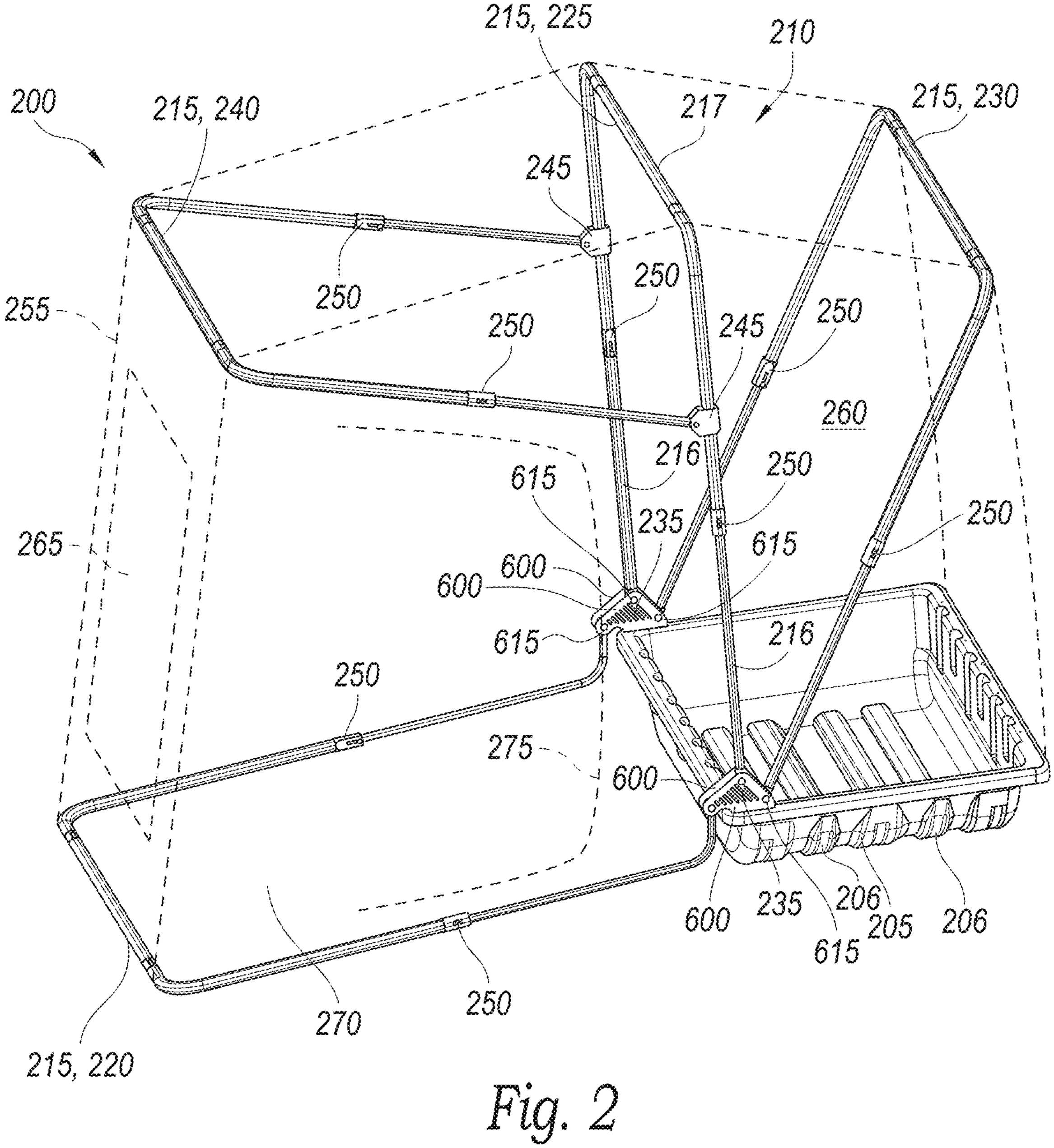
FIG. 2 illustrates a shelter configured in accordance with embodiments of the present technology.

FIG. 2 illustrates a shelter 200 configured in accordance with embodiments of the present technology, in a deployed configuration. The shelter 200 may include a base, such as a container 205, and a frame structure 210 that is deployable from the base or container 205. In some embodiments, the container 205 may be a sled container with optional runners 206 for sliding through snow or across terrain, or for otherwise engaging a surface, such as a ground surface. The container 205 supports or stores the frame structure 210 when the frame structure 210 is in a stowed configuration (see, for example, FIG. 3A, described below).

The frame structure 210 includes a plurality of support structures, such as support arches 215, that pivot from the container 205 during deployment. Each support structure or support arch 215 may include two arms 216 and a transverse portion 217 connecting the two arms 216. The transverse portion 217 may span all or some of a width of the container 205. In some embodiments, a ground arch 220, a middle roof arch 225, and a rear roof arch 230 may pivot from the container 205 via one or more corresponding pivot points in stationary hinges 235. A first stationary hinge 235 may be positioned on a first side of the container and a second stationary hinge 235 may be positioned on a second, opposing side of the container. Several of the support arches 215 (such as the ground arch 220, the middle roof arch 225, and the rear roof arch 230) may span between the stationary hinges 235 (for example, the arms 216 may be connected to the stationary hinges 235). The ground arch 220 may pivot toward the ground or downward, and it may rest on a ground surface. The middle roof arch 225 and rear roof arch 230 may pivot to an upright position. In some embodiments, the ground arch 220, the middle roof arch 225, and the rear roof arch 230 may pivot from the same stationary hinges 235, or they may each pivot via their own hinges.

In accordance with embodiments of the present technology, a cantilevered arch 240 may extend from (it may be cantilevered from) one of the other support arches 215, such as the middle roof arch 225. The support arches 215 other than the cantilevered arch 240 may be referred to as upright support arches or first support arches, and the cantilevered arch 240 may be referred to as a second support arch. The cantilevered arch 240 may be attached to the middle roof arch 225 via sliding hinges 245 positioned on opposing sides/arms 216 of the middle roof arch 225 (a sliding hinge 245 on a first arm 216 of the middle roof arch 225 and a sliding hinge 245 on a second arm 216 of the middle roof arch 225).

The sliding hinges 245, which are described in detail below, facilitate pivoting the cantilevered arch 240 relative to the middle roof arch 225 in addition to sliding the pivot point (sliding the hinge 245) along the middle roof arch 225. The sliding hinges 245 may be referred to as slidable hinges or translatable hinges, and their motion may be described as translating along the middle roof arch 225 (or along another arch to which such a hinge 245 is attached). The sliding hinges 245 translate toward and away from the pivot points between the middle roof arch 225 and the container 205 (such as the pivot points in the stationary hinges 235).

The stationary hinges 235 are described as "stationary" because, in some embodiments, they may be fixed in place relative to the container 205, in contrast to the movable sliding hinges 245. One or more of the support arches 215 may include telescoping joints 250. The telescoping joints 250, which are described in detail below, further facilitate deployment and compact stowage of the frame structure 210 by allowing extension and retraction of the support arches 215.

The shelter 200 may also include a flexible shell, such as a fabric shell 255 (shown as an outline in FIG. 2) encasing an interior 260 of the shelter 200. The fabric shell 255 may include a front door or front panel opening 265 (shown as an outline in FIG. 2). A side 270 of the fabric shell 255 may include a side door or side panel opening 275 (shown as an outline in FIG. 2). The openings 265, 275 may be suitably sized and shaped for human ingress into and egress from the shelter 200. The fabric shell 255 may be removably attached to the frame structure 210 by any suitable mechanism or fastener, such as with clips, hook-and-loop fasteners, snaps, or sleeves in the fabric shell 255 through which elements of the frame structure 210 may pass. The transverse portions 217 of the support structures or arches 215 may support the top or upper portions of the fabric shell 255. Although fabric is described for the shell, any suitable flexible or semi-flexible material may be used as the shell material.

According to embodiments of the present technology, none of the support arches 215 obstruct the side panel opening 275 when the shelter 200 is in the deployed configuration. Rather, for example, the cantilevered arch 240 is elevated above the side panel opening 275 via the sliding hinges 245. As described below with reference to FIGS. 3A-3F, the frame structure 210 is deployable by pivoting the support arches 215 from the container 205 and positioning the cantilevered arch 240 (by moving the sliding hinges 245).

Figure 3A:
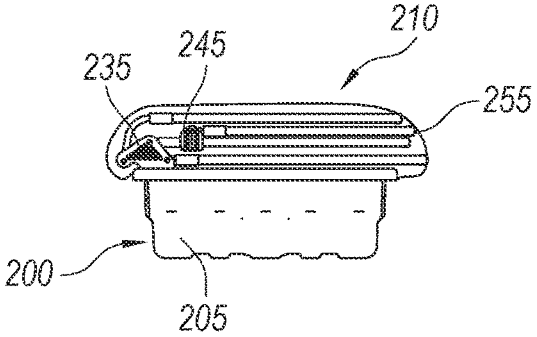
FIGS. 3A-3F illustrate schematic side views of the shelter shown in FIG. 2 in various stages of a deployment process, in accordance with embodiments of the present technology.

FIGS. 3A-3F illustrate schematic side views of the shelter 200 shown in FIG. 2 in various stages of a deployment process, in accordance with embodiments of the present technology. FIGS. 3A-3F show one side of the shelter 200. The other side may look similar and may have similar features and mechanisms, and stowage and deployment of the other side may happen concurrently with (and in a similar manner as) stowage and deployment of the illustrated side. In FIG. 3A, the shelter 200 (and the frame structure 210) is in a stowed configuration, with the elements of the frame structure 210 collapsed or pivoted onto or into the container 205, and with the fabric shell 255 folded around the collapsed frame structure 210 and into or onto the container 205.

Figure 3B:
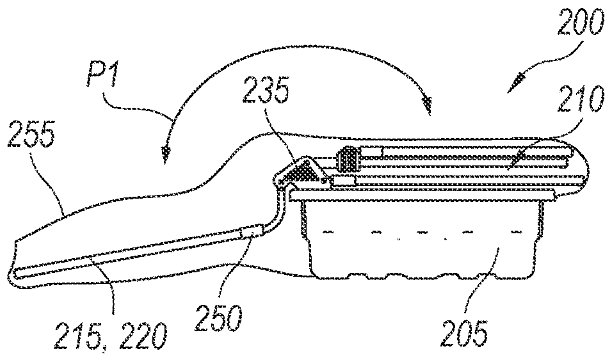

FIG. 3B shows the shelter 200 in an early stage of the deployment process. Specifically, the ground arch 220 is pivoted along pathway P1 about the stationary hinges 235, away from the container 205, until it rests on the ground. In FIG. 3B, the fabric shell 255 has begun to unfold for deployment (being releasably attached to the frame structure 210).

Figure 3C:
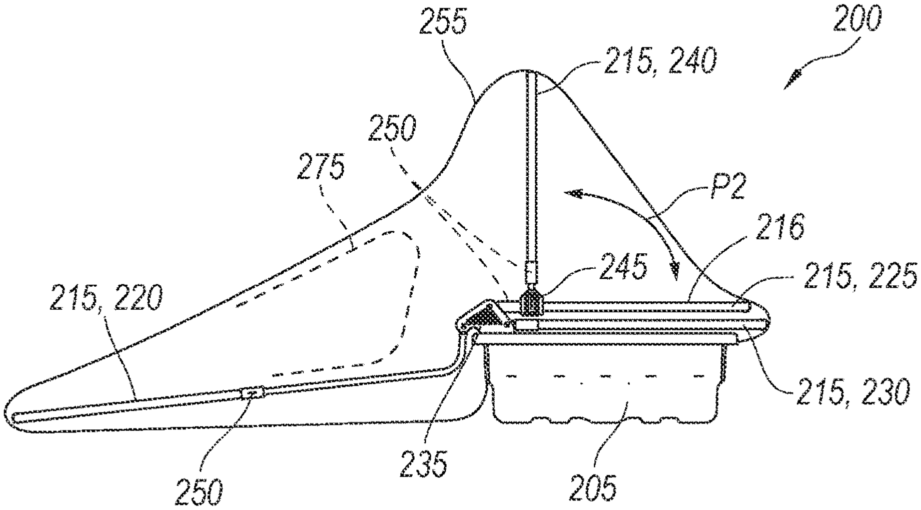

FIG. 3C shows next steps in the deployment process. Optionally, the ground arch 220 may be extended via the telescoping joints 250. The cantilevered arch 240 may be rotated along pathway P2 away from the container 205 via the sliding hinges 245 (which facilitate pivoting between the cantilevered arch 240 and the middle roof arch 225). The fabric shell 255 continues to unfold from its collapsed state.

Figure 3D:
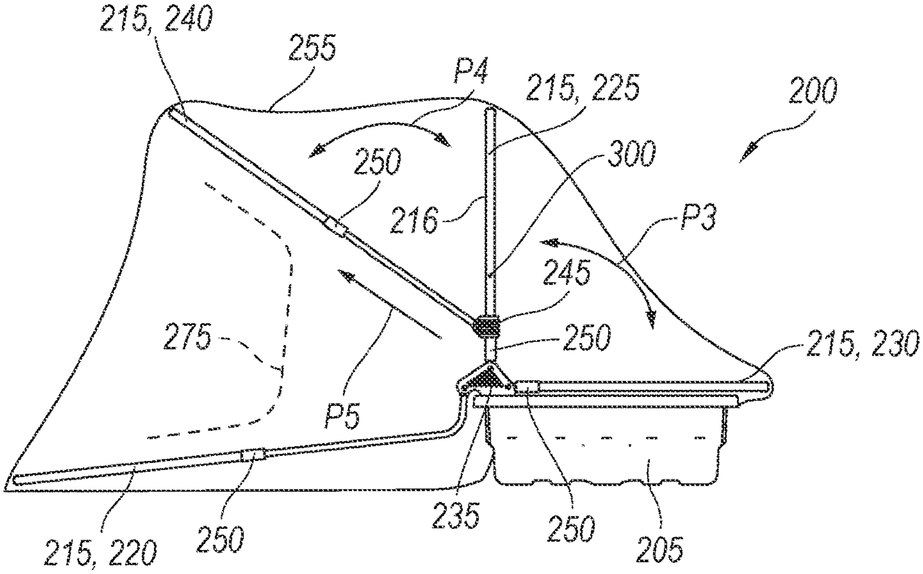

FIG. 3D shows further steps in the deployment process. The middle roof arch 225 may be rotated along pathway P3, pivoting about the stationary hinges 235, away from the container 205. Because the cantilevered arch 240 is attached to the middle roof arch 225, the cantilevered arch 240 may also rotate forward, along pathway P4. The angle between the cantilevered arch 240 and the middle roof arch 225 may be adjusted along pathway P4 to generally angle the cantilevered arch 240 so that it supports an upper forward corner of the fabric shell 255. Optionally, the cantilevered arch 240 may be extended with the telescoping joints 250 along pathway P5. The fabric shell 255 continues to unfold from its collapsed state. FIG. 3D also shows a catch 300 in the middle roof arch 225, which may be a hole or a depression for receiving a detent element in the sliding hinge 245 as described in further detail below with regard to FIG. 3E. Such a catch 300 may be included in each vertical arm of the middle roof arch 225.

Figure 3E:
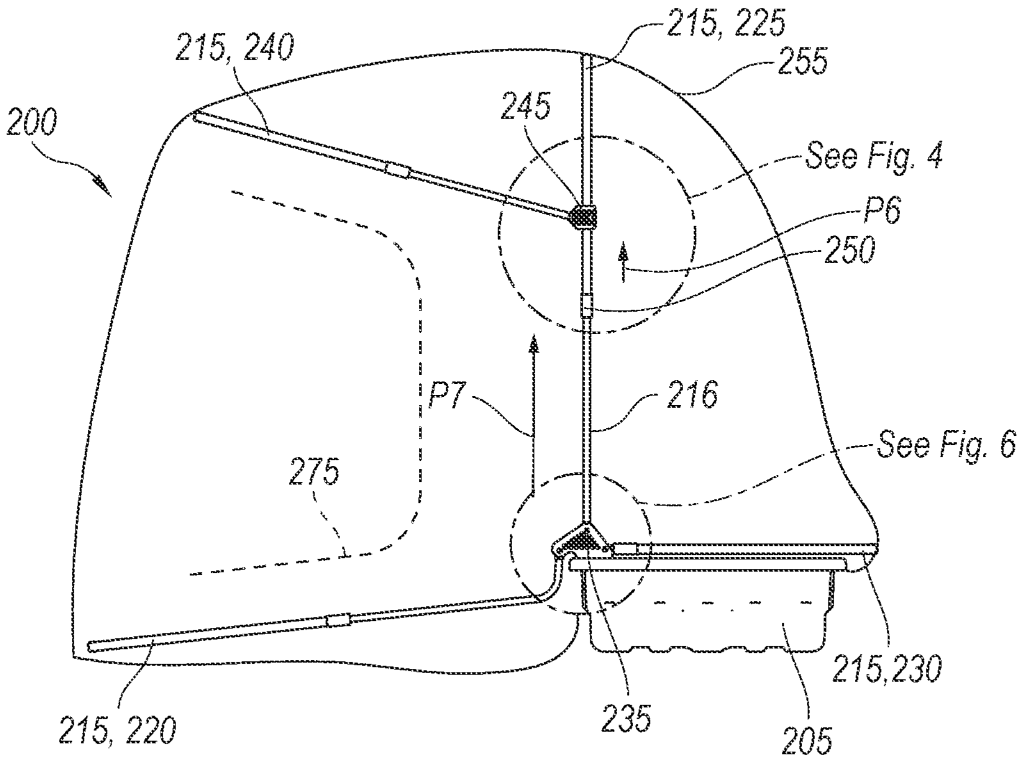
Figure 4:
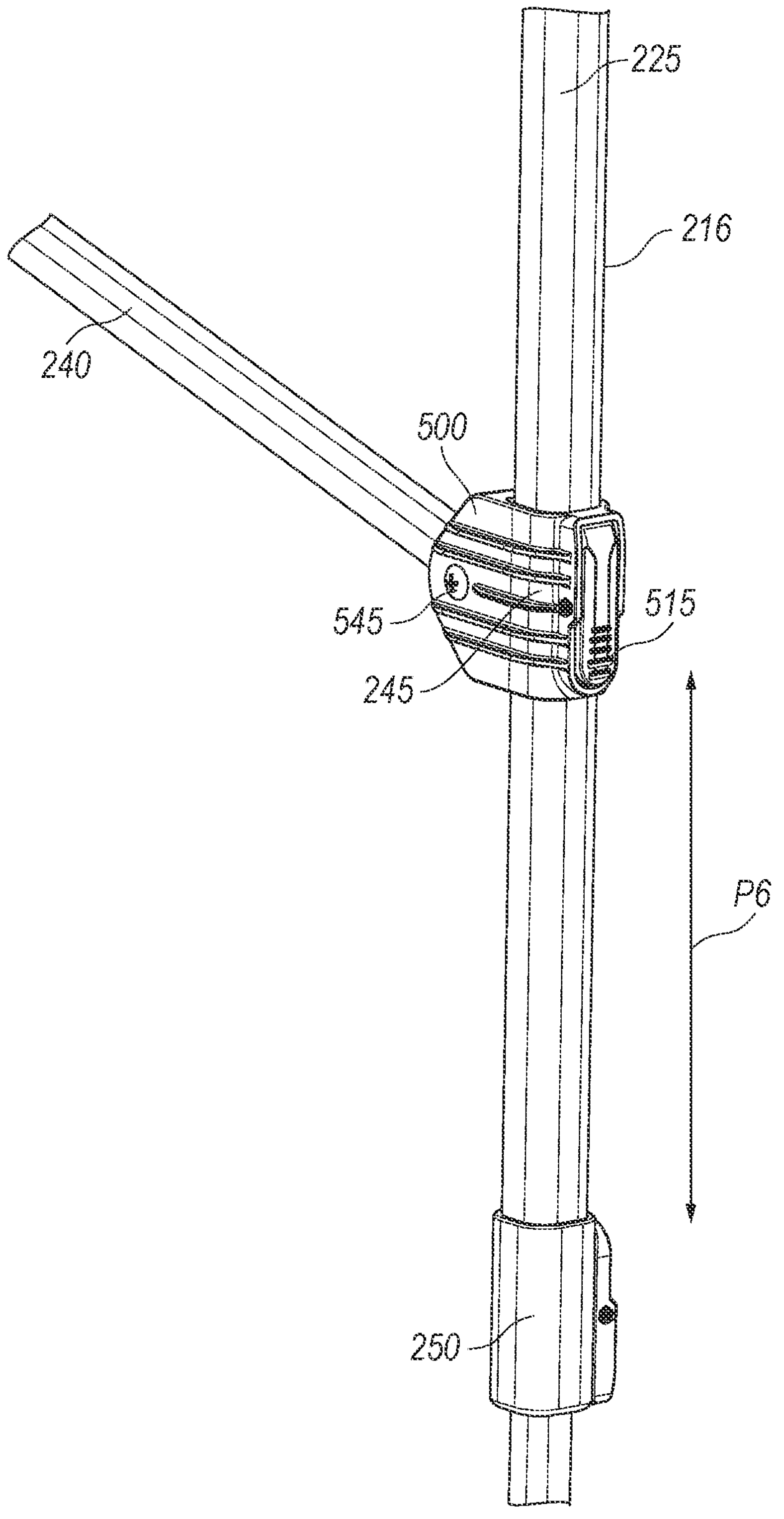
FIG. 4 illustrates a detail view of the sliding hinge, the middle roof arch, and the cantilevered arch shown in FIG. 3E, in accordance with embodiments of the present technology.
Figure 6:
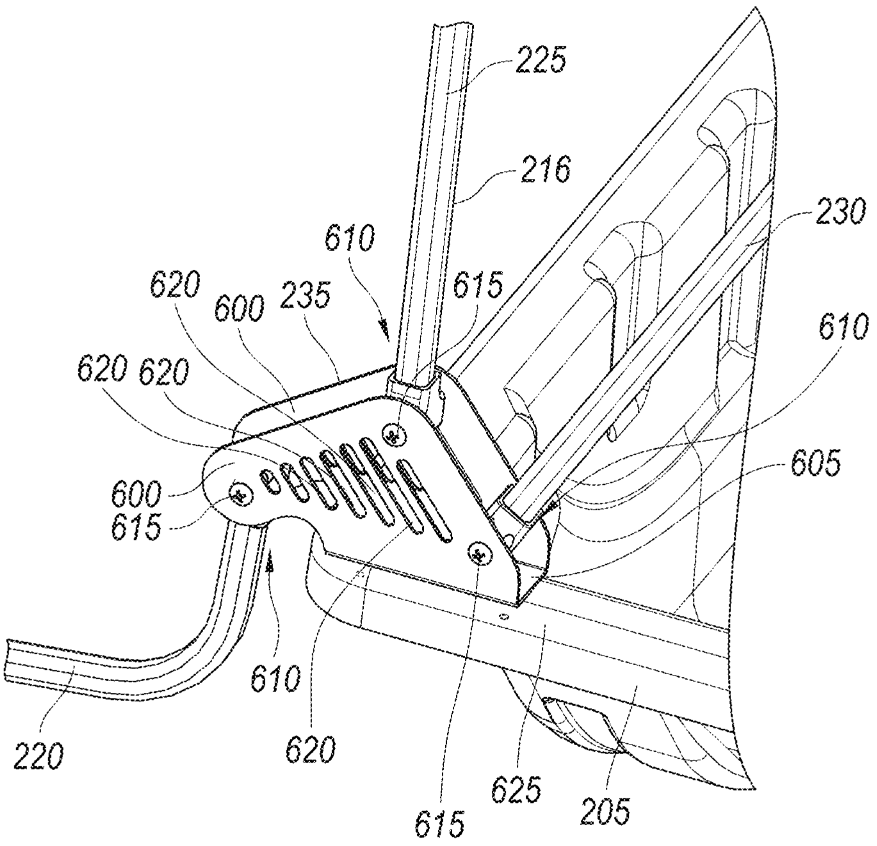
FIG. 6 illustrates a detail view of a portion of the shelter illustrated in FIG. 3E, showing a stationary hinge.

FIG. 3E shows further steps in the deployment process. The sliding hinge 245 is releasably locked into place, having moved (by sliding or translating) along an arm of the middle roof arch 225 along pathway P6 and engaged with the catch 300 (see FIG. 3D). Another sliding hinge 245 on the opposite side of the shelter 200 (not shown in FIG. 3E, but visible in FIG. 2, for example) may also be releasably locked into place after moving along the other arm 216 of the middle roof arch 225 in a similar manner, and by similarly engaging with a catch 300. Accordingly, in the stowed configuration (FIG. 3A), the sliding hinge 245 is positioned at a first location on the middle roof arch 225, and in the deployed configuration, the sliding hinge 245 is positioned at a second location on the middle roof arch 225 that is a greater distance from the stationary hinge 235 than the distance between the first location and the stationary hinge. Optionally, the stationary hinges 235 may be omitted and one or more arches 215 may be pivotably attached to the container 205 in other ways. Accordingly, the stowed configuration comprises the sliding hinge 245 being positioned at a first distance from a pivot point associated with the middle roof arch 225, and the deployed configuration comprises the sliding hinge 245 being positioned at a second distance from the pivot point associated with the middle roof arch 225, with the second distance being greater than the first distance. Optionally, the middle roof arch 225 may be extended along pathway P7 via the telescoping joints 250, to further raise the roof of the fabric shell 255 and the height of the cantilevered arch 240. As indicated in FIG. 3E, FIGS. 4 and 6 illustrate further details of the sliding hinge 245 and the stationary hinges 235, respectively.

Figure 3F:
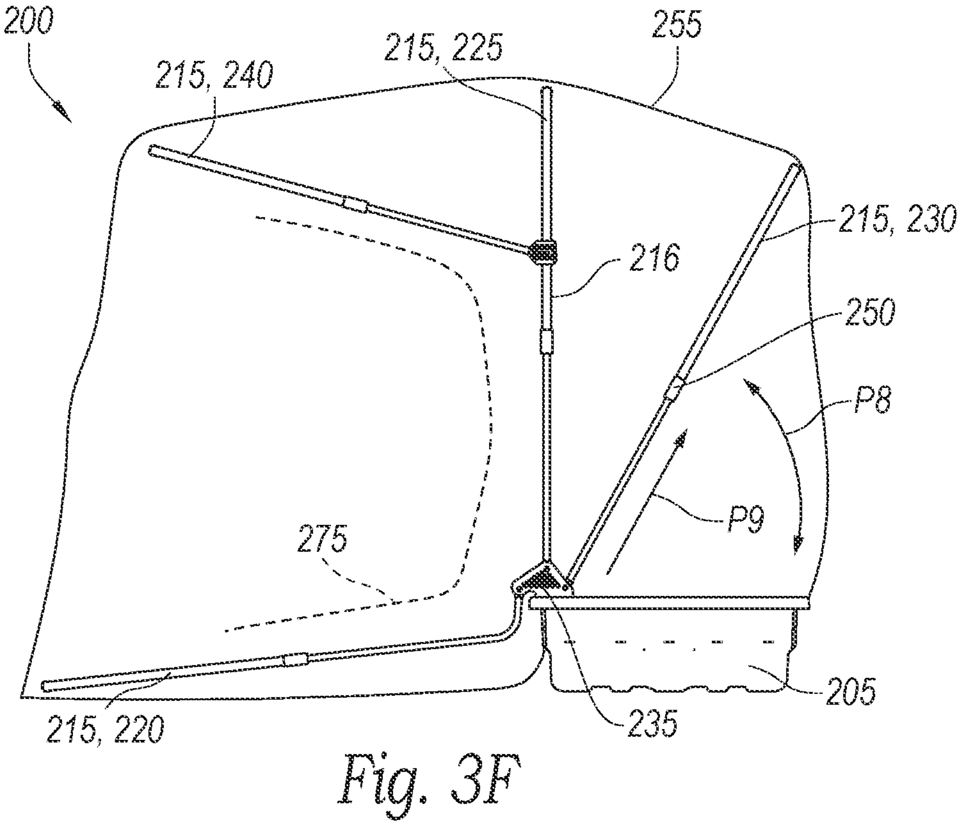

FIG. 3F illustrates a final or nearly final step in deployment of the shelter 200 (and the frame structure 210). The rear roof arch 230 may be rotated along pathway P8, upward and away from the container 205, via the stationary hinges 235, to provide support for the fabric shell 255 at the upper rear corner of the shelter 200. Optionally, the rear roof arch 230 may be extended via the telescoping joint 250, along pathway P9. The support arches 215 support the fabric shell 255 above the ground and above the container, to cover or enclose the interior 260 of the shelter (see FIG. 2).

In the deployed configuration, the side panel opening 275 is unobstructed by the support arches 215, including the cantilevered arch 240. A user may enter and exit the shelter 200 via the side panel opening 275. Although FIGS. 3A-3F illustrate one example of a deployment process, in some embodiments, a deployment process may involve other steps or performing steps in another order different from the order described above.

Although in several embodiments of the present technology, the hinges 245 may be "sliding" hinges, in some embodiments, the hinges that connect the cantilevered arch 240 to another arch 215 (such as the middle roof arch 225) may not be slidable. Rather, they may instead be fixed hinges positioned in a stationary location along the arches 215 or arms 216 to which they are connected. For example, in some embodiments, the hinges 245 may be fixed hinges positioned generally as shown in FIG. 3E.

In other words, in some embodiments, a cantilevered arch 240 may be attached to, may extend from, and may pivot relative to, another arch 215 (such as the middle roof arch 225) such that the cantilevered arch 240 and the hinges 245 are elevated above the stationary hinges 235, and the side panel opening 275 is unobstructed. Accordingly, embodiments of the present technology include sliding hinges 245 and fixed variants of the sliding hinges 245. Because one or more (such as all) of the arches 215 or arms 216 may include telescoping features facilitating extension and retraction, the deployment process may generally be similar to the process described above with regard to FIGS. 3A-3F, with the exception that the non-sliding hinge 245 may not translate along the middle roof arch 225.

Figure 5:
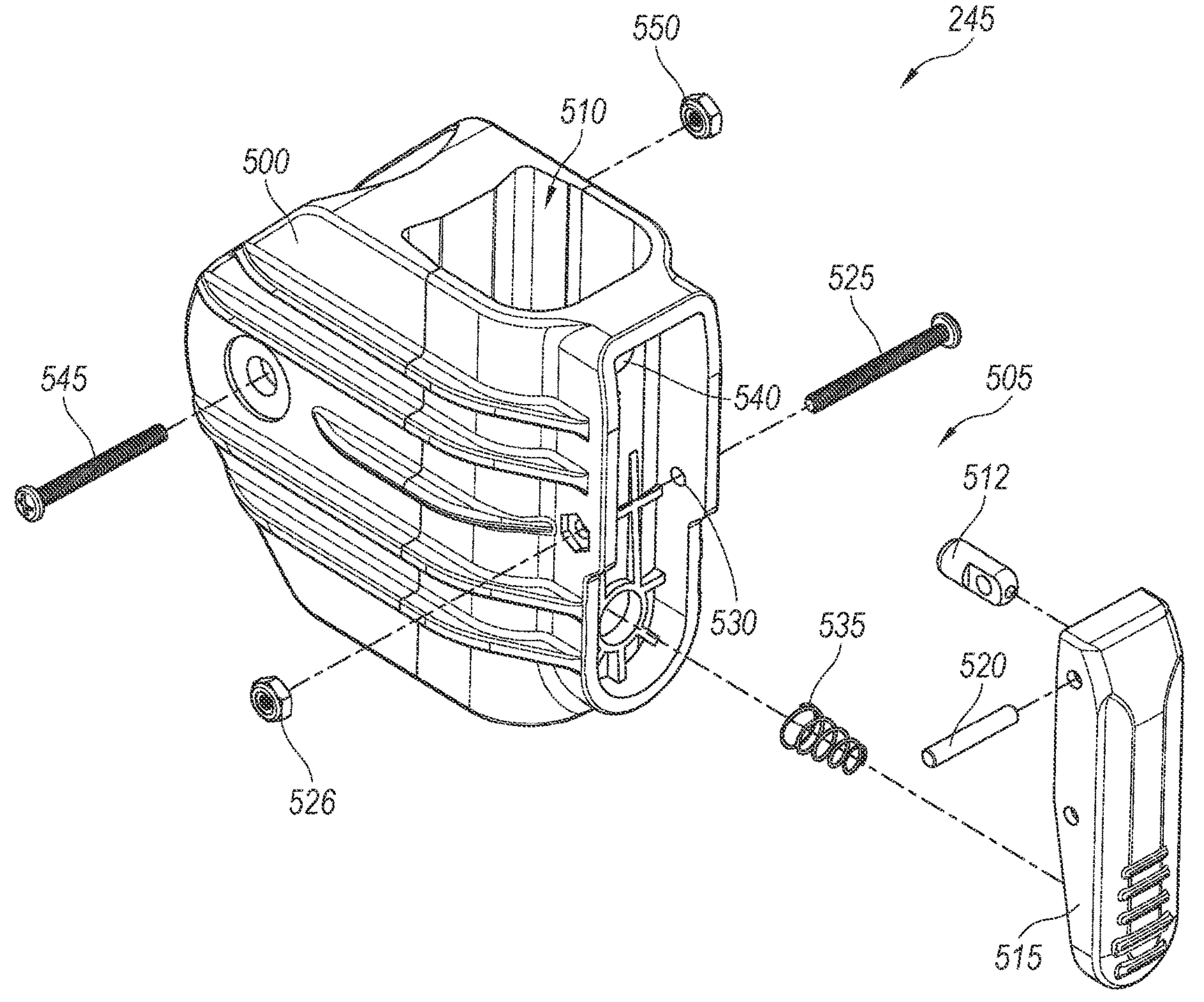
FIG. 5 illustrates an exploded view of the sliding hinge shown in FIG. 4, in accordance with embodiments of the present technology.

FIG. 4 illustrates a detail view of the sliding hinge 245, an arm 216 of the middle roof arch 225, and the cantilevered arch 240 shown in FIG. 3E. FIG. 5 illustrates an exploded view of the sliding hinge 245, configured in accordance with embodiments of the present technology. With reference to FIGS. 4 and 5, the sliding hinge 245 may include a hinge body 500 and a locking mechanism 505. The hinge body 500 may include a passageway 510 through which a pole or shaft may pass, for example, one of the arms 216 of the middle roof arch 225 (see, for example, FIGS. 3E and 4).

The passageway 510 facilitates sliding of the hinge 245 along the middle roof arch 225. The locking mechanism 505 may releasably lock the sliding hinge 245 in a selected position on the middle roof arch 225. For example, the locking mechanism 505 may include a detent element 512, a button 515, a retaining pin 520 positioned to hold the detent element 512 in engagement with the button 515, a pivot shaft 525 (which may be a bolt retained with a nut 526 in a bearing hole 530 in the hinge body 500), and a spring 535 positioned between the button 515 and the hinge body 500.

In operation, the spring 535 biases the button 515 about the pivot shaft 525 in a manner that forces the detent element 512 inward toward the hinge body 500. The detent element 512 projects through a hole 540 in the hinge body 500. When the sliding hinge 245 arrives at the catch 300 (see FIG. 3D), the force of the spring 535 pushes the detent element 512 into the catch 300 to engage the catch 300 and prevent further sliding of the hinge 245 along the middle roof arch 225. To release the hinge 245 and allow the hinge 245 to slide along the middle roof arch 225, a user may press the button 515 to compress the spring 535 and withdraw the detent element 512 from the catch 300. Accordingly, the locking mechanism 505 selectively locks the sliding hinge 245 at a selected position.

The hinge body 500 also supports an end of the cantilevered arch 240 (such as an end of an arm of the cantilevered arch 240). Continuing reference to FIGS. 4 and 5, the cantilevered arch 240 may be pivotally retained in the hinge body 500 by a shaft 545 passing through the hinge body 500 and the cantilevered arch 240. In some embodiments, the shaft 545 may be a bolt held in the hinge body 500 by a nut 550. The cantilevered arch 240 may pivot freely relative to the middle roof arch 225. In some embodiments, constraints of the remainder of the shelter limit movement of the cantilevered arch 240, for example, spreader poles described below with regard to FIG. 8 may support the cantilevered arch 240, or the fabric shell 255 may support the cantilevered arch 240 (via tension in the fabric when the fabric is attached to the fabric shell 255).

As described in detail above, in some embodiments, the hinge 245 illustrated in FIGS. 4 and 5 may be a fixed hinge. Accordingly, in some embodiments, the hinge 245 may omit a locking mechanism and it may instead be bolted to the arm 216 or otherwise suitably attached to the arm 216 in a fixed (non-translating) manner.

FIG. 6 illustrates a detail view of a portion of the shelter 200 illustrated in FIG. 3E, showing one of the stationary hinges 235. Each stationary hinge 235 may connect multiple support arches 215 such that several arches 215 pivot with one hinge 235. For example, the ground arch 220, the middle roof arch 225, and the rear roof arch 230 may pivot relative to the container 205 via the same hinge 235. In some embodiments, each stationary hinge 235 may include two plate elements 600 extending away from the container 205 and another plate element 605 transverse to the two plate elements 600 and connecting the two plate elements 600. The two plate elements 600 may be parallel to each other. An end 610 of each of the support arches 215 (the ground arch 220, the middle roof arch 225, and the rear roof arch 230) may be positioned between the two plate elements 600. Each stationary hinge 235 may further include a plurality of fasteners 615 (e.g., three fasteners 615) extending through one or both of the plate elements 600 and through each end 610 of the support arches. The fasteners 615 may be arranged in a triangular pattern as generally illustrated in FIG. 6. For each hinge 235, the fasteners 615 may be fixed in place relative to the hinge 235. Each of the plate elements 600 may include a plurality of parallel elongated slots 620 extending entirely through each plate element 600 and along a transverse direction relative to an edge 625 of the container 205. With additional reference to FIG. 2, one plate element 600 of each stationary hinge 235 may be located between the two arms 216 of each of the support arches 215 (the ground arch 220, the middle roof arch 225, and the rear roof arch 230).

Figure 7:
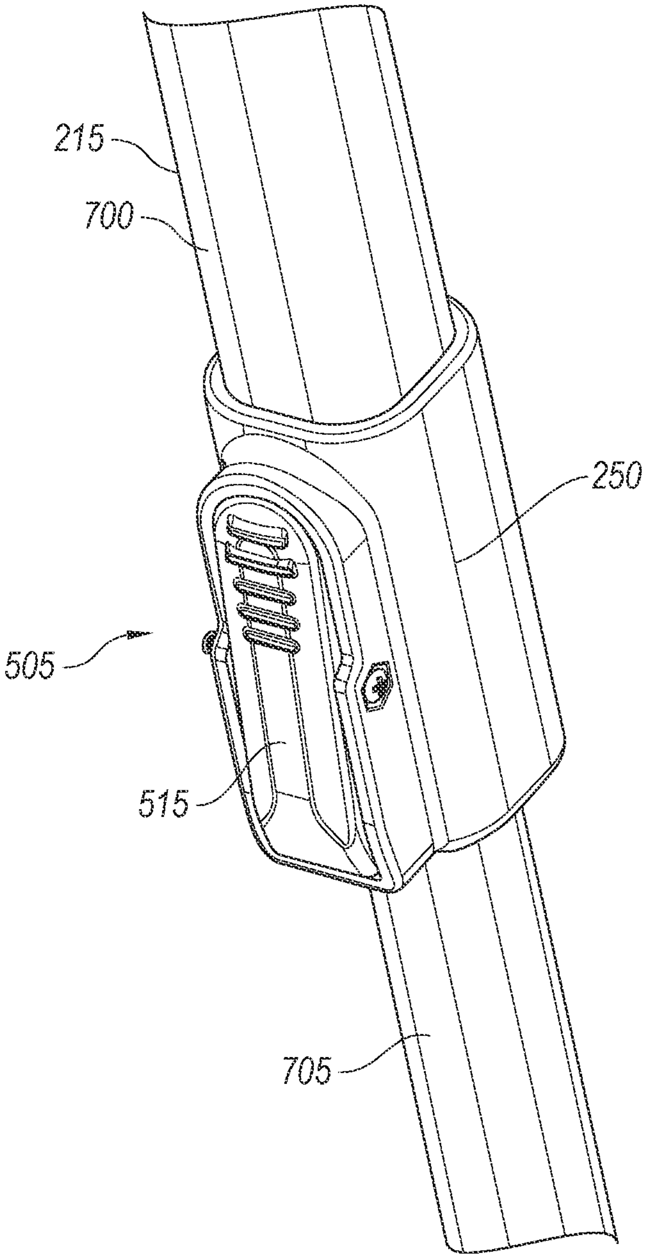
FIG. 7 illustrates a telescoping joint configured in accordance with embodiments of the present technology.

FIG. 7 illustrates a telescoping joint 250 configured in accordance with embodiments of the present technology. The telescoping joint 250 may be releasably lockable to facilitate a stable frame structure 210 when the shelter 200 is in a deployed configuration. The telescoping joint 250 may be implemented on any of the support arches 215 (see FIG. 2). Accordingly, the support arches 215 may be telescopically extendable and retractable, having a wider tube portion 700 extending over a narrower tube portion 705 (or vice versa). The telescoping joint 250 may be attached to the wider tube portion 700. The telescoping joint 250 may include a locking mechanism 505 like the locking mechanism 505 of the sliding hinge 245 (in other words, a detent element of the locking mechanism may be biased into a hole on the narrower tube portion 705 to releasably lock the tubes 700, 705 relative to each other in an extended position during or after deployment of the shelter), or it may include another suitable locking mechanism.

Figure 8:
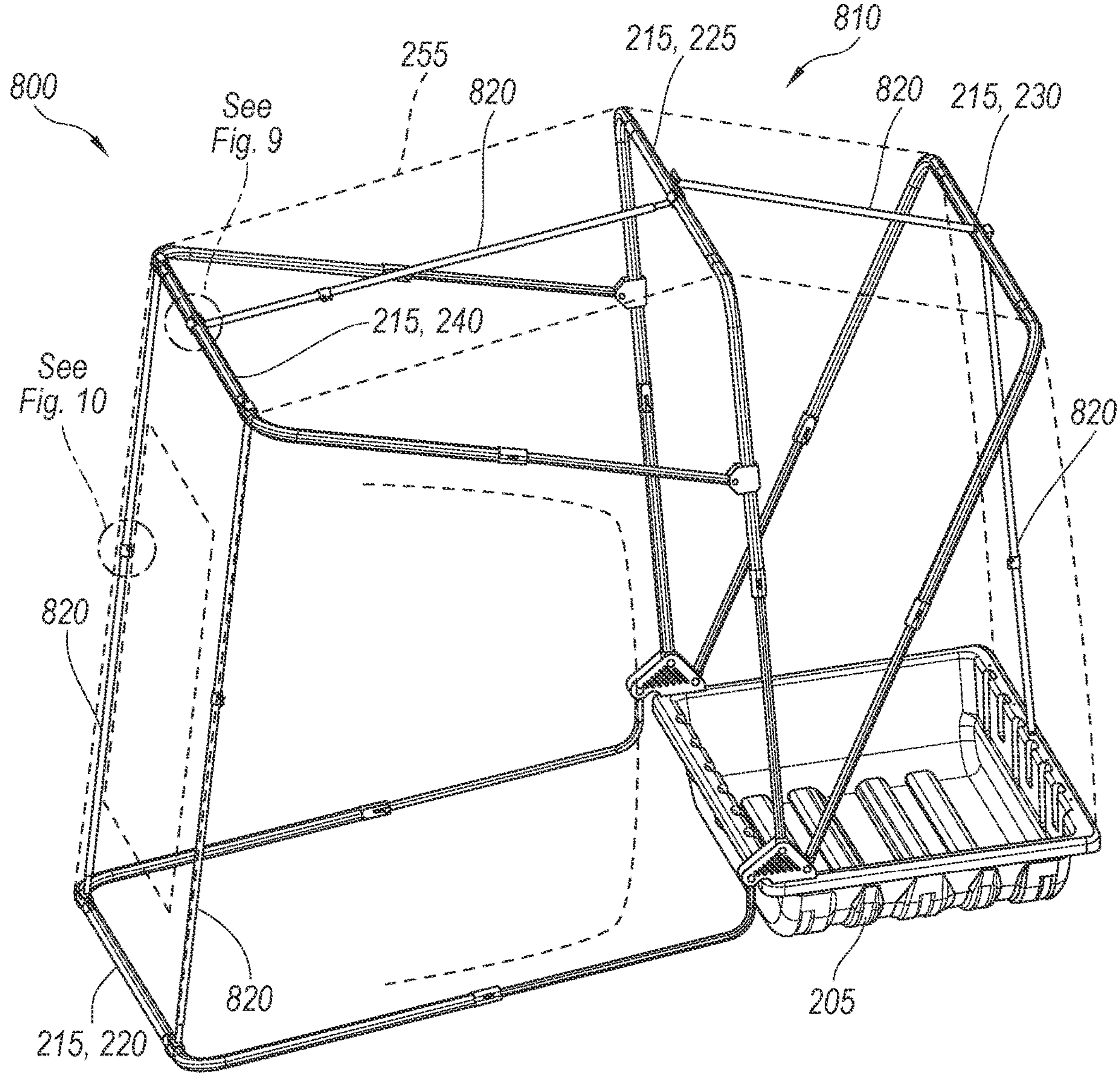
FIG. 8 illustrates a deployable shelter configured in accordance with further embodiments of the present technology.

FIG. 8 illustrates a deployable shelter 800 configured in accordance with further embodiments of the present technology. The deployable shelter 800 may be similar to, or the same as, the deployable shelter 200 described above with regard to FIGS. 2-7, except that the frame structure 810 may further include one or more spreader poles 820 for additional reinforcement and stability. One or more spreader poles 820 may connect any two adjacent support arches 215 to maintain support and distance between the adjacent support arches 215.

In some embodiments, the shelter 800 may include five spreader poles 820. For example, two spreader poles 820 may span between (and connect) the ground arch 220 and the cantilevered arch 240. A spreader pole 820 may span between (and connect) the cantilevered arch 240 and the middle roof arch 225. A spreader pole 820 may span between (and connect) the middle roof arch 225 and the rear roof arch 230. A spreader pole 820 may span between (and connect) the rear roof arch 230 and the container 205. The spreader poles 820 may connect to the support arches 215 with any suitable device or mechanism.

The spreader poles 820 may be removable and replaceable from positions between any two of the support arches 215 or the container 205. The spreader poles 820 may also be extendable and retractable, as described below with reference to FIG. 10. Extending and retracting the spreader poles 820 facilitates further adjustment of tightness, stiffness, and stability of the overall frame structure 810.

Figure 9:
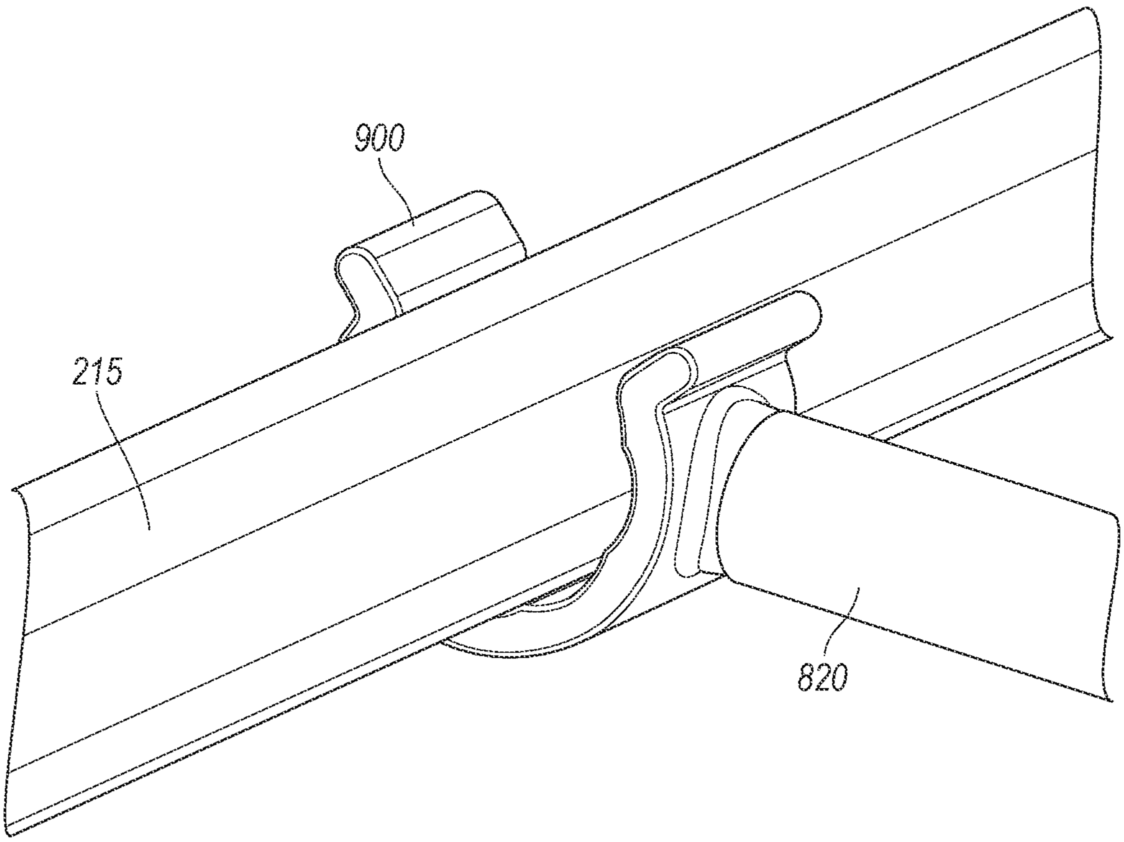
FIG. 9 illustrates a connection between a spreader pole and one of the support arches of a frame structure, in accordance with embodiments of the present technology.

FIG. 9 illustrates a connection between one of the spreader poles 820 and one of the support arches 215. In some embodiments, the spreader pole 820 can include a clip element 900 on one or both ends of the spreader pole 820. The clip element 900 may be in the form of a flexible hook configured to clip onto and off of the support arch 215, or it may have any other suitable configuration.

Figure 10:
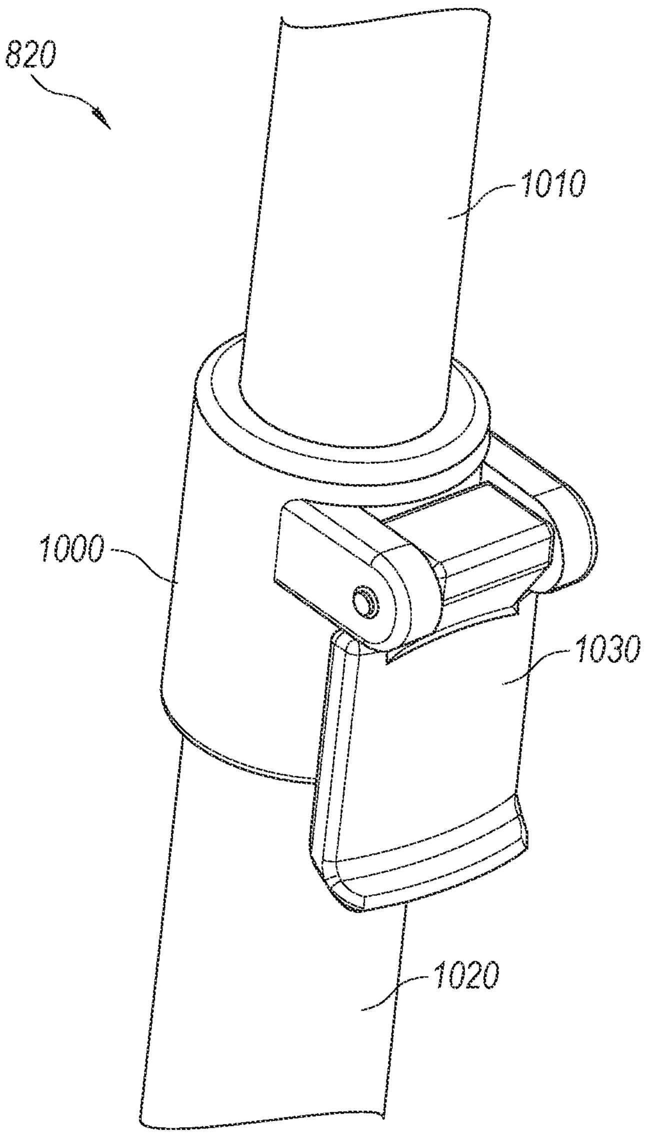
FIG. 10 illustrates a locking mechanism for facilitating telescopic extension and retraction of spreader poles, in accordance with embodiments of the present technology.

FIG. 10 illustrates a locking mechanism 1000 for facilitating telescopic extension and retraction of a spreader pole 820, in accordance with embodiments of the present technology. The spreader pole 820 may include a first pole segment 1010 that moves telescopically within and relative to a wider second pole segment 1020. The locking mechanism 1000 may be attached to the second pole segment 1020, and it may include a lever 1030 positioned to apply or remove friction from the first pole segment 1010 to selectively allow or resist extension and retraction of the spreader pole 820. Although a representative locking mechanism 1000 is illustrated and described as an option for selectively allowing or resisting extension and retraction of the spreader pole 820, other locking mechanisms suitable for resisting or allowing telescopic extension of poles may be used, such as twist-lock mechanisms or button locks (detents).

Aspects of embodiments of the present technology include a frame structure with components that may be always or nearly always connected to each other during stowage and deployment, which reduces the quantity of parts that may be at risk of being misplaced or broken. The present technology facilitates faster setup than traditional shelters, includes greater side-door dimensions than existing shelters due to the cantilevered arch 240 being positioned generally above the side door as opposed to cutting across it, and provides reduced dimensions in the stowed configuration relative to traditional shelters. One feature of the present technology is that the cantilevered arch 240 may remain connected to the remainder of the frame structure (for example, frame structures 210, 810) while the shelter is stowed, throughout the deployment process, and while the shelter is deployed. In other words, in some embodiments, the cantilevered arch 240 and other support arches 215 need not be removed or separated from the structure at any time during normal stowage, deployment, or use, which simplifies deployment and stowage, reduces the time it takes to deploy and stow the shelter, and reduces the risk of misplacing or breaking components or connecting elements.

From the foregoing, it will be appreciated that specific embodiments of the presently disclosed technology have been described herein for purposes of illustration, but that various modifications may be made without deviating from the scope of the technology. For example, frame components and frame structures configured in accordance with embodiments of the present technology (such as hinges, arches, poles, locking mechanisms, or joints) may be implemented in other frames or structures. In some embodiments, frame structures may omit one or more components, such as one or more of the support arches, one or more of the hinges, or one or more of the locking mechanisms. Accordingly, shelters and frame structures configured in accordance with embodiments of the present technology may include other combinations of features disclosed herein.

Although some shelters configured in accordance with embodiments of the present technology may be portable, in some embodiments, shelters may be permanent or semi-permanent. Although containers are described for supporting the frame structures, in further embodiments, other bases, including bases that are not containers, may support the frame structures. Although the support structures or "arches" 215 are described as arches, it is understood that they need not be rounded and may be rectilinear, triangular, or have other shapes or arrangements that span between pivot points and create a space beneath the arches suitable for forming part of a shelter. They may also have curved portions, straight portions, or other suitable shapes.

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A portable shelter comprising:

a container;

a first hinge attached to a first side of the container, wherein the first hinge comprises at least one first plate element extending away from the container;

a second hinge attached to a second side of the container, wherein the second hinge comprises at least one second plate element extending away from the container;

a plurality of first support arches pivotably attached to the container via the first and second hinges, wherein the first support arches span between the first hinge and the second hinge, and wherein each of the first support arches comprises two arms and a transverse portion connecting the two arms;

three fasteners, wherein each fastener extends through the at least one first plate element and through a corresponding first support arch of the plurality of first support arches, wherein the fasteners are fixed in place relative to the first hinge in a triangular pattern;

a second support arch connected to the arms of one of the first support arches; and a flexible shell, wherein the flexible shell is positionable to cover the plurality of first support arches and the second support arch, and wherein the flexible shell comprises an opening and a door for selectively covering the opening;

wherein:

for each of the plate elements, the plate element comprises a plurality of parallel elongated slots extending entirely through the plate element along a transverse direction relative to an edge of the container;

the shelter is configurable between (a) a stowed configuration, in which the plurality of first support arches and the second support arch are collapsed onto or into the container and the flexible shell is folded onto or into the container, and (b) a deployed configuration, in which the plurality of first support arches and the second support arch are pivoted away from the container, and in which the one of the first support arches and the second support arch support the flexible shell above the container to form an interior of the shelter; and when the shelter is in the deployed configuration, a perimeter of the opening is positioned entirely below the second support arch to facilitate human ingress into and egress from the interior of the shelter.

2. The portable shelter of claim 1, wherein each of the plate elements is located between the two arms of each of the first support arches.

3. The portable shelter of claim 1, wherein:

the at least one first plate element comprises two first plate elements;

the two first plate elements are parallel to each other;

the first hinge further comprises a third plate element connecting the two first plate elements; and an end of each of the first support arches is positioned between the two first plate elements.

4. The portable shelter of claim 1, wherein the second support arch comprises a telescoping joint.

5. The portable shelter of claim 1, further comprising a spreader pole positionable between, and attachable to, two of the first support arches.

6. The portable shelter of claim 1, wherein the container comprises runners for engaging a ground surface.

7. A shelter comprising:

a frame structure comprising a first support arch, a second support arch, and a third support arch, wherein the first support arch comprises two arms and a transverse portion connecting the arms, and wherein the third support arch is attached to each arm of the first support arch at a corresponding attachment location along each arm of the first support arch;

a flexible shell configured to be supported on the frame structure;

a plurality of fasteners, and a base for supporting the frame structure;

wherein:

the first support arch is pivotably attached to the base via a hinge;

the second support arch is pivotably attached to the base via the hinge;

the hinge comprises a plate element extending away from a side of the base;

the plate element comprises a plurality of parallel elongated slots extending entirely through the plate element along a transverse direction relative to an edge of the base;

the plate element is positioned between the two arms of the first support arch;

each of the first support arch and the second support arch is attached to the plate element via a corresponding fastener of the plurality of fasteners;

the fasteners are fixed in place relative to the plate element in a triangular pattern;

the first support arch comprises a telescoping joint configured to selectively extend the first support arch away from the base in an extended configuration or toward the base in a retracted configuration;

when the first support arch is in the retracted configuration, each attachment location is positioned a first distance away from the hinge; and when the first support arch is in the extended configuration, each attachment location is positioned a second distance away from the hinge that is greater than the first distance.

8. The shelter of claim 7, wherein:

the flexible shell comprises an opening and a door for selectively covering the opening;

the shelter is configurable between a stowed configuration and a deployed configuration;

the stowed configuration comprises the first support arch being in the retracted configuration; and the deployed configuration comprises:

(a) the first support arch being in an extended configuration;

(b) the third support arch extending transversely from the first support arch;

(c) the flexible shell being positioned over the first support arch and the third support arch; and (d) a perimeter of the opening or a perimeter of the door being positioned entirely below the third support arch.

9. The shelter of claim 7, further comprising a ground arch configured to pivot away from the base to be supported on a ground surface.

10. The shelter of claim 7, wherein the base comprises a container having runners for engaging a ground surface.

11. The shelter of claim 7, wherein the hinge comprises two additional plate elements, wherein two of the plate elements are parallel with each other and one of the plate elements is transverse to the two of the plate elements and connects the two of the plate elements, and wherein an end of each of the first support arch and the second support arch is positioned between the two of the plate elements.

12. A shelter comprising a frame structure, the frame structure being configurable between a stowed configuration and a deployed configuration, the frame structure comprising:

a first support arch pivotably attached to a container via a pair of plate elements connected to the container, wherein the first support arch comprises two arms and a transverse portion extending between the arms, and wherein each arm includes a telescoping joint for extending or retracting the arms;

a second support arch attached to the arms; and a fastener extending through a first plate element of the pair of plate elements and through a first arm of the two arms;

wherein:

for each of the plate elements, the plate element comprises a plurality of parallel elongated slots extending entirely through the plate element along a transverse direction relative to an edge of the container;

the telescoping joint moves the second support arch toward and away from the plate elements;

the plate elements are positioned between the arms; and the fastener is fixed in place relative to the first plate element.

13. The shelter of claim 12, further comprising a flexible shell positionable over the first support arch and the second support arch, the flexible shell having an opening positioned entirely beneath the second support arch when the frame structure is in the deployed configuration.

14. The shelter of claim 12, wherein the container comprises runners for sliding across a ground surface.

15. The shelter of claim 12, further comprising:

a third support arch pivotably attached to the container via the plate elements; and a ground arch pivotably attached to the container via the plate elements;

wherein:

when the frame structure is in the stowed configuration, the first support arch, the second support arch, the third support arch, and the ground arch are pivoted onto or into the container; and when the frame structure is in the deployed configuration, the ground arch is pivoted away from the container to be supported on a ground surface, the first support arch is pivoted away from the container to an upright position, the third support arch is pivoted away from the container to an upright position, and the second support arch is cantilevered from the first arch.

16. The shelter of claim 15, further comprising a flexible shell positionable over the first support arch, the second support arch, the third support arch, and the ground arch, wherein the flexible shell comprises an openable panel defining an opening, and wherein the opening is not obstructed by the second support arch when the frame structure is in the deployed configuration.

17. The shelter of claim 12, further comprising a third support arch and a removable pole, wherein the removable pole is positionable between, and connectable to, the third support arch and the container.

18. The shelter of claim 12, wherein the fastener is a first fastener, and wherein the shelter further comprises:

a third support arch pivotably attached to the container via the plate elements;

a fourth support arch pivotably attached to the container via the plate elements;

a second fastener; and a third fastener;

wherein:

the second fastener extends through the first plate element and through the third support arch;

the third fastener extends through the first plate element and through the fourth support arch;

the second fastener is fixed in place relative to the first plate element;

the third fastener is fixed in place relative to the first plate element; and the first fastener, the second fastener, and the third fastener are arranged in a triangular pattern about the first plate element.

* * * * *